United States Patent
Qin

(10) Patent No.: US 9,454,356 B2
(45) Date of Patent: Sep. 27, 2016

(54) METHOD OF AND TERMINAL FOR UPDATING LIBRARY FILE IN SYSTEM APPLICATION

(71) Applicants: HISENSE BROADBAND MULTIMEDIA TECHNOLOGIES CO., LTD., Qingdao, Shandong (CN); HISENSE USA CORPORATION, Suwanee, GA (US); HISENSE INTERNATIONAL CO., LTD., Qingdao, Shandong (CN)

(72) Inventor: Shurong Qin, Shandong (CN)

(73) Assignees: HISENSE BROADBAND MULTIMEDIA TECHNOLOGIES CO., LTD., Qingdao, Shandong (CN); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 0 days.

(21) Appl. No.: 14/547,624

(22) Filed: Nov. 19, 2014

(65) Prior Publication Data

US 2016/0054990 A1 Feb. 25, 2016

(30) Foreign Application Priority Data

Aug. 20, 2014 (CN) .......................... 2014 1 0412964

(51) Int. Cl.
*G06F 9/44* (2006.01)
*G06F 9/445* (2006.01)
*H04L 29/08* (2006.01)

(52) U.S. Cl.
CPC ................. *G06F 8/65* (2013.01); *G06F 9/445* (2013.01); *H04L 67/34* (2013.01)

(58) Field of Classification Search
CPC ....................................................... G06F 8/65
See application file for complete search history.

(56) References Cited

U.S. PATENT DOCUMENTS

| 5,721,824 A * | 2/1998 | Taylor | G06F 8/61 709/203 |
|---|---|---|---|
| 2009/0260004 A1* | 10/2009 | Datta | G06F 8/65 717/175 |
| 2009/0307684 A1* | 12/2009 | Best | G06F 8/60 717/174 |
| 2013/0031539 A1* | 1/2013 | Liverance | G06F 9/44 717/171 |
| 2015/0220326 A1* | 8/2015 | Jia | H04M 1/72525 717/170 |

* cited by examiner

*Primary Examiner* — Philip Wang
(74) *Attorney, Agent, or Firm* — Boyle Fredrickson, S.C.

(57) ABSTRACT

The invention discloses a method of upgrading a library the of a system application and a terminal, where when it is determined that the package name of an upgrade installation package is recorded in system properties, a user partition is searched by the package name of the upgrade installation package for an upgraded library file corresponding to the upgrade installation package, where the package name of the upgrade installation package is recorded in the system properties when it is determined that an application corresponding to the upgrade installation package is a system application; an original library file stored in a system partition is replaced with the found upgraded library file; and the package name of the upgrade installation package recorded in the system properties is deleted.

11 Claims, 3 Drawing Sheets

METHOD OF AND TERMINAL FOR UPDATING LIBRARY FILE IN SYSTEM APPLICATION

CROSS-REFERENCES TO RELATED APPLICATIONS

This application claims the benefit of Chinese Patent Application No 201410412964.7, filed with the Chinese Patent Office on Aug. 20, 2014 and entitled "method of and terminal for updating library file in system application", which is hereby incorporated by reference in its entirety.

FIELD

The present invention relates to the field of network multimedia terminals and particularly to a method of and terminal for updating a library file in a system application.

BACKGROUND

At present, in order to offer a variety of applications in terminals, to reflect the diversity of the terminals and to improve their core competitiveness, numerous manufacturers of Android terminals have come to cooperate with third-party application providers to thereby preset applications, well experienced by and popular to users, as system applications of the terminals. However due to the open-source nature and the de-compilation possibility of the applications in the Android system, many of the third-party application providers will not provide codes and other information of the applications directly but typically package their codes and other core technologies in the form of library files for security and provide the manufacturers of Android terminals with the library files, and then the library files are run and loaded by the users or the manufacturers in the Android terminals to perform specific functions of the applications.

The applications in the Android terminals can be categorized into system applications and user applications, where a system application is an application preset by a manufacturer and characterized in that the system application is stored in a read-only system partition (the /system partition), and a library file corresponding thereto needs to be stored under a dynamic library file directory of system applications (the /system/lib directory) and could not be uninstalled; and a user application is an application selected by a user for installation and characterized in that the application is stored in a readable and writable user partition (the /data partition), and a library file corresponding thereto is stored in a dynamic library file directory of applications (the /data/app-lib directory) upon installation and can be uninstalled by the user.

When the application of the system application including the library file is preset, the library file is generated under the /system/lib directory, and when the system application is upgraded automatically, the updated library file can only be written into the /data/app-lib directory due to the read-only property of the system partition. When the application of the Android system is run, the library file is loaded in a general interface scheme, and in a particular process thereof, the library file is searched for by the name of the library file and loaded, where in a particular search process, firstly the /system/lib directory is searched for a library file matching the package name of an upgrade installation package, and if the library file exists, then it is loaded; otherwise, secondly the /data/app-lib directory is searched for a library file matching the package name of the upgrade installation package, and if the library file is found, then it is loaded.

Apparently in the mechanism of the Android system to load a library file, firstly the /system/lib directory is searched, and when some system application A is upgraded automatically, an upgraded library file is generated under the /data/app-lib directory, and at this time, there are an original library file under the /system/lib directory and the upgraded library file under the /data/app-lib directory. Moreover the library file, name of the original library file and the library file name of the post-grade library file are the same for the system application. Thus the Android terminal loading the library file searches the /system/lib directory by the package name of an upgrade installation package for a library file matching the upgrade installation package, will loading the original library file without searching for and loading the library file under the /data/app-lib directory, so that the upgraded library file can not be loaded successfully.

In order to update the system application, the library file under the /system/lib library is typically updated by upgrading the Android system to thereby load successfully the upgraded library file. Particularly the entire system partition can be erased and written into so that the upgraded library file is put directly into the /system/lib directory and packaged to thereby upgrade the entire system. Thereafter when the system application load the library files, the library file under the /system/lib director is the upgraded library file. However the entire Android system may be upgraded due to the upgrade of the library file at an increase in overhead of the system while hindering the system application from being improved and updated constantly, thus lowering the experience of the user.

SUMMARY

An aspect provides a method of upgrading a library file of a system application, the method including: when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application; replacing an original library file stored in a system partition with the upgraded library file found in the user partition, in a process, privileged to modify a file in the system partition, among existing processes; and deleting the package name of the upgrade installation package recorded in the system attributes.

Another aspect further provides a method of upgrading a library file of a system application, the method including: when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application, replacing an original library file stored in a system partition with the upgraded library file found in the user partition; and deleting the package name of the upgrade installation package recorded in the system attributes.

A further aspect further provides a terminal including a memory and one or more processors, wherein the memory has one or more computer readable program codes stored therein, and the one or more processors are configured to perform the one or more computer readable program codes to implement: when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application; to replace an original library file stored in a system partition with the upgraded library file found in the user partition; and to delete the package name of the upgrade installation package recorded in the system attributes.

BRIEF DESCRIPTION OF THE DRAWINGS

In order to make the technical solution according to embodiments more apparent, the drawings to be used in a description of the embodiments will be briefly introduced, below, and apparently the drawings to be described below are merely illustrative of some of the embodiments, and those ordinarily skilled in the art can derive from these drawings other drawings without any inventive effort. In the drawings.

DETAILED DESCRIPTION

The technical solution according to the embodiments will be described below clearly and fully with reference to the drawings. Apparently the described embodiments are only a part but all of the embodiments. Based upon the embodiments, all of other embodiments derived by those ordinarily skilled in the art without any inventive effort shall come into the scope.

In an embodiment, when it is determined that the package name of an upgrade installation package is recorded in system properties, a user partition is searched by the package name of the upgrade installation package for an upgraded library file corresponding to the upgrade installation package, where the package name of the upgrade installation package is recorded in the system properties when it is determined that an application corresponding to the upgrade installation package is a system application; an original library file stored in a system partition is replaced with the found upgraded library file; and the package name of the upgrade installation package recorded in the system properties is deleted, thereby avoiding the upgraded library file from failing to be loaded when the system application corresponding to the upgrade installation package is upgraded separately; and also in the solution according to the application, the entire system is avoided from being upgraded when some system application is upgraded separately, thereby lowering the overhead of the system and improving the efficiency of upgrading the system application as well as improving the experience of a user to some extent.

The technical solution of the application will be described below in details with reference to the drawings in the following particular embodiments, but the application will not be limited to the following embodiments.

Figure 1:
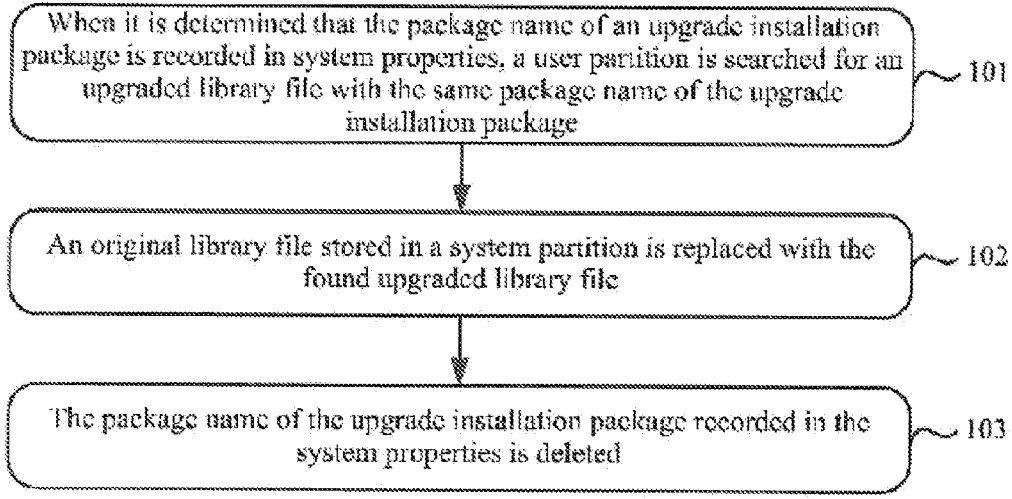
FIG. 1 is a schematic flow chart of operations in a method of upgrading a library file of a system application according to an embodiment.

As illustrated in FIG. 1, there is illustrated a schematic flow diagram of operations in a method of upgrading a library file of a system application according to an embodiment, where the method particularly includes the following operations:

In the operation 101, when it is determined that the package name of an upgrade installation package is recorded in system properties, a user partition is searched by the package name of the upgrade installation package for an upgraded library file corresponding to the upgrade installation package.

Where the package name of the upgrade installation package is recorded in the system properties when it is determined that an application corresponding to the upgrade installation package is a system application.

In the embodiment, the terminal which is powered on enters an automatic library file update process by default, where it can be determined by reading directly a system property file whether the package name of the upgrade installation package is recorded in the system property file, for example, information in the system property file is read, and it is determined that the package name of the upgrade installation package is recorded in the system property file after the package name of the upgrade installation package is read. Furthermore the user partition of the terminal is searched by the read package name of the upgrade installation package for the stored upgraded library file corresponding to the upgrade installation package, and particularly in a process of upgrading the system application, after the upgrade installation package is downloaded and installed and the system application is run, the upgraded library file of the system application is stored under a /data/app-lib directory of the user partition, so the user partition can be searched by the read package name of the upgrade installation package for the upgraded library file corresponding to the upgrade installation package. The search above can be performed as in a search scheme in the prior art, and the invention will not be limited to any particular search scheme.

It shall be noted that the upgrade installation package is a compressed package, configured for installation, in the format of xx.apk, and the package name of the installation package can be modified at will and invisible, for example, the package name of an installation package of some system application is "com.hisense.sangguosha", but the name of the system application is harden in program and can not be modified, and the name of the system/user application is invisible to a user, for example, the name of the system/user application is "sanguosha". The package name "com.hisense.sangguosha" is a unique identifier of the application "sanguosha" in the system, and taking "sanguosha" as an example of the system application, after the system application "sanguoshe" is updated, a directory /data/data/com.hisense.sangguosha is generated in the user partition, and the updated library file is generated under the directory /data/data/com.hisense.sangguosha/lib/.

In the operation 102, an original library file stored in a system partition is replaced with the found upgraded library file.

In a mechanism of loading a library file, firstly the /system/lib directory is searched for a library file matching the package name of the upgrade installation package, and if the library file exists, then it is loaded; otherwise, the /data/app-lib directory is searched for a library file matching the package name of the upgrade installation package, and if the library file is found, then it is loaded. Thus in order to avoid the original library file from being identified as the upgraded library file and loaded and the upgraded library file from failing to be loaded without changing the mechanism of loading a library file, in the embodiment, the original library file stored in the system partition is replaced with the upgraded library file, in the user partition, founded in the operation 101 in an embodiment, the upgraded library file exists in the same form, at the same location, etc., as the previous original library file after the replacement operation.

In a real process of the loading the library file, after the upgraded library file with the same package name of the upgrade installation package is found in the operation 101, the upgraded library file has been updated, and the package name of the upgraded library file is stored correspondingly under the directory created for the upgrade installation package, but the contents of the upgraded library file may be substantially the same as the contents of the original library file, so the replacement operation in the operation 102 may be skipped in this case, for example, systems applications visible to the user, e.g., a display on an interface, a jump to a page, etc. . . . , are upper basic system applications, so their library files will not be changed after they are upgraded, and thus in view of these system applications, it needs to be judged before the operation 102 is performed whether the upgraded library file is consistent with the original library file stored in the system partition, and if so, then loading of the library file is terminated; otherwise, the operation 102 is performed where the upgraded library file is replaced with the original library file. Particularly it can be judged whether the upgraded library file is consistent with the original library file as follows: an MD5 value of the upgraded library file and an MD5 value of the original library file are calculated respectively and compared, and if a comparison result shows consistency, then it is determined that the upgraded library the is consistent with the original library file, and the library file can be loaded directly without performing the replacement operation in the operation 102; or if the comparison result shows in consistency, then it is determined that the upgraded library file is inconsistent with the original library file, and the original library file needs to be replaced with the upgraded library file, that is, the upgraded library file is copied into the system partition so that firstly the upgraded library file can be loaded from the system partition instead of loading the original library file from the system partition.

In the operation 103, the package name of the upgrade installation package recorded in the system properties is deleted.

In order to avoid the update operation from being performed repeatedly by the terminal each time it is powered on the package name of the upgrade installation package recorded in the system properties is deleted after the operation 102 is performed.

In the embodiment, the upgraded library file has been previously stored in the system partition, so still the library file in the system partition will be loaded firstly in the existing mechanism of loading a library file, and at this time, the library file in the system partition has been replaced with the upgraded library file, and thus the system partition will be searched by the package name of the upgrade installation package for the upgraded library file matching for the upgraded library file matching the package name of the upgrade installation package (which can also be considered matching with the application program), and the upgraded library file will be loaded, thereby avoiding the upgraded library file from failing to be loaded when the system application corresponding to the upgrade installation package is upgraded separately; and also in the solution according to the invention, the entire system is avoided from being upgraded when some system application is upgraded separately, thereby lowering the overhead of the system and improving the efficiency of upgrading the system application as well as improving the experience of a user to some extent.

In an embodiment, before the operation 101 is performed, the terminal needs to inquire an application upgrade server periodically, where there is a network connection between the terminal and the application upgrade server; and if an upgrade installation package is found, then it is downloaded, where the upgrade installation package is an installation package corresponding to a new version of an application included in the application upgrade server; the downloaded upgrade installation package is detected, and the package name of the upgrade installation package is recorded in the system properties when it is determined that the application corresponding to the upgrade installation package is a system application; and the upgrade installation package is installed by invoking a system service program interface, where an upgraded library file corresponding to the upgrade installation package is stored in the user partition.

In an embodiment, the downloaded upgrade installation package is detected and the package name of the upgrade installation package is recorded in the system properties when it is determined that the application corresponding to the upgrade installation package is a system application particularly as follows: the downloaded upgrade installation package is detected, the name of the upgrade installation package is obtained, an identification bit of the application corresponding to the upgrade installation package is read, and when the identification bit is read as 1, it is determined that the application corresponding to the upgrade installation package is a system application, and the obtained package name of the upgrade installation package is recorded in the system properties.

In an embodiment, before the original upgrade installation package is replaced with the upgraded library file, the method further includes:

It is judged whether the upgraded library file is consistent with the original upgrade installation package stored in the system partition, and if so, then upgrading of the library file is terminated; otherwise, the original library file is replaced with the upgraded library file.

The method above of upgrading a library file of a system application will be described below in a particular example. Since the upgraded system application may not be put into use (that is, the library file is loaded) immediately, upgrading of the system application and upgrading of the library file of the system application will be respectively described below in the example.

Figure 2:
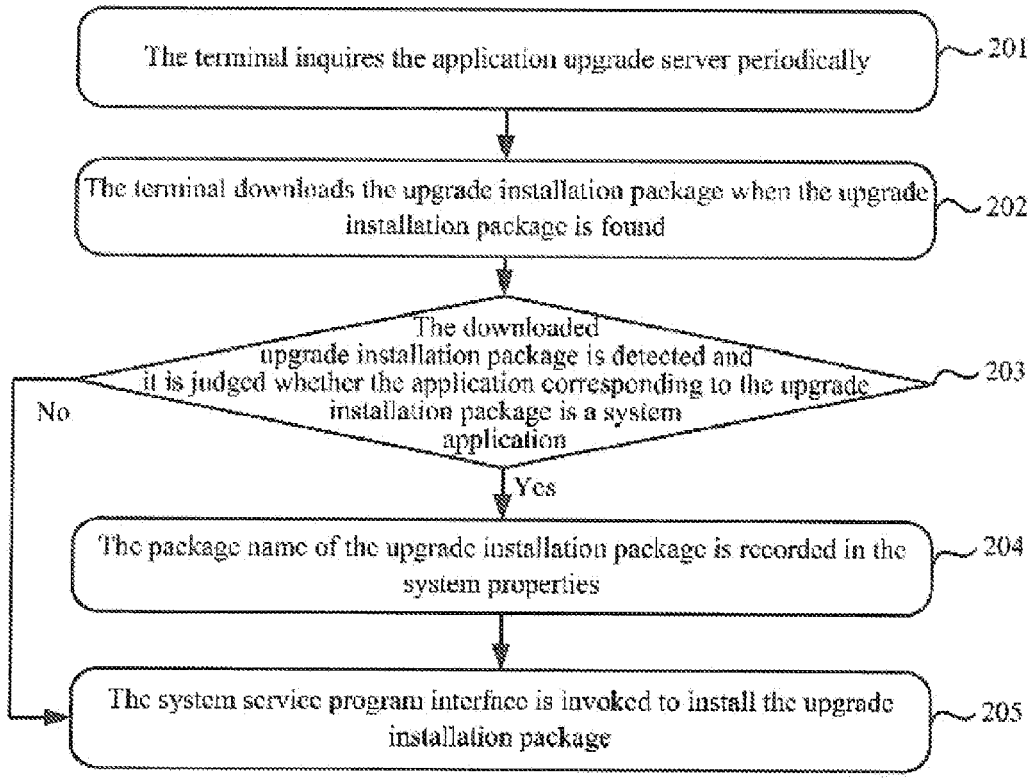
FIG. 2 is a schematic flow chart of operations in a method of upgrading a system application in an example.

As illustrated in FIG. 2, there is illustrated a schematic flow chart of operations in a method of upgrading a system application in this embodiment, where the method generally includes the following operations:

In the operation 201, the terminal inquires the application upgrade server periodically.

In this example, there is a wireless or wired network connection established between the terminal and the application upgrade server, and since the terminal may be a handset, a PAD or another mobile terminal, the connection can be preferably established wirelessly. The application program upgrade server can be a server at the network side or can be a server in a local area network, but the invention will not be limited in this regard.

In the operation 202, the terminal downloads the upgrade installation package when the upgrade installation package is found.

The upgrade installation package is an installation package corresponding to a new version of the system application in the application upgrade server.

In the operation 203, the downloaded upgrade installation package is detected, and it is judged whether the application corresponding to the upgrade installation package is a system application, and if so, then the operation 204 is performed; otherwise the operation 205 is performed.

Particularly in this operation 203, it can be judged by reading the identifier of the upgrade installation package whether the application corresponding to the upgrade installation package is a system application, and typically, for example, the identifier of a system application is 1, and the identification of a user application is 0; and if the identifier of the upgrade installation package is read as 1, then it is determined that the application corresponding to the upgrade installation package is a system application, and if the identifier of the upgrade installation package is read as 0, then it is determined that the application corresponding to the upgrade installation package is a user application. Since the original library file of the user application is stored automatically in the user partition, the corresponding upgraded library file is stored automatically in the user partition and even the original library file in the user partition is replaced automatically therewith after the user application is upgraded; and the terminal also loads the library file by firstly searching the system partition, and if no library file is found, then searching the user partition and loading the library file.

In the operation 204, the package name of the upgrade installation package is recorded in the system properties.

Particularly in an implementation, a property of persist-.sys.updateapp is added to the system properties to record the package name of a downloaded upgrade installation package, where the system property provides a read/write interface convenient to implement with good universality. Of course, the package name of the upgrade installation package can alternatively be recorded in another property file, and this embodiment will not be limited in this regard.

In the operation 205, the system service program interface is invoked to install the upgrade installation package.

During installation, the system partition can not be written into, so the upgraded library file corresponding to the upgrade installation package is stored in the user partition. The library file will not be loaded during installation but will be loaded when the system application is run.

Figure 3:
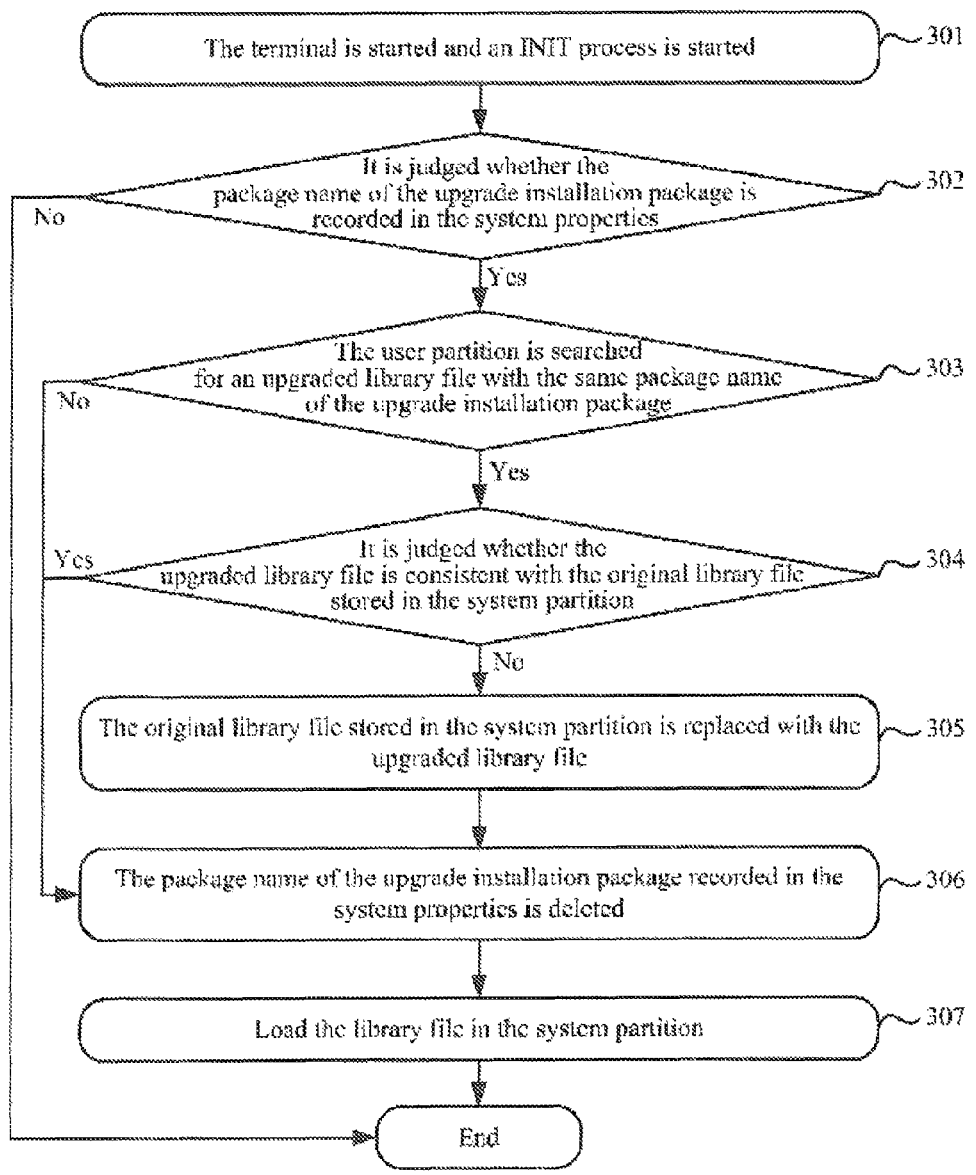
FIG. 3 is a schematic flow chart of operations in a method of upgrading a library file of a system application in an example.

A flow of upgrading a library file of a system application will be described below in a particular example, as illustrated in FIG. 3, where the flow generally includes the following operations:

In the operation 301, the terminal is started and an min process is started.

The terminal is started, and the INIT process is started, where the UNIT initialization process is started by starting the library file update service process correspondingly, that is, triggering upgrading of the library file to be started. It shall be noted that in the embodiment, the terminal is started as an initial operation, and when the terminal is powered on, the INIT process with a root privilege starts the library file automatic update process, for example, checks the file system, clears /tmp, starts various services and starts getty, i.e., a terminal control and management command, for respective terminals and a virtual console; but it is defaulted that the library file update service process has been started when the terminal is powered on. The operation 302 can be performed as long as the library file update service process is started.

Of course, in some case, the user can alternatively create a process privileged to modify a file in the system partition in place of the INIT process without departing from the scope of the application.

In the operation 302, it is judged whether the package name of the upgrade installation package is recorded in the system properties, and if so, then the flow proceeds to the operation 303; otherwise, upgrading is terminated.

In the operation 303, the user partition is searched for an upgraded library file with the same package name of the upgrade installation package, and if so, then the flow proceeds to the operation 304; otherwise, the flow jumps to the operation 306.

In the operation 304, it is judged whether the upgraded library file is consistent with the original library file stored in the system partition, and if so, then the flow proceeds to the operation 305; otherwise, the flow jumps to the operation 306.

In the operation 305, the original library file stored in the system partition is replaced with the upgraded library file.

In the operation 306, the package name of the upgrade installation package recorded in the system properties is deleted.

Typically the upgraded library file can be loaded after being updated successfully. In an embodiment, the package names of a plurality of update installation packages to be updated may be recorded in the system properties since there could be a plurality of library files need to be upgraded. Thus the flow can jump to the operation 302 after the operation 306 is performed.

In the operation 307, the upgraded library file is loaded.

The system application is started and run by the user through clicking or other operations, and then the upgraded library file is downloaded.

Stated otherwise, a library file upgrade procedure in the process with the root privilege when the terminal is powered on is utilized in this embodiment.

Advantageous effects of the embodiment above are as follows: a system application corresponding to an upgrade installation package is run, and when it is determined that the package name of the upgrade installation package is recorded in system properties, a user partition is searched by the package name of the upgrade installation package for an upgraded library file matching the upgrade installation package, an original library file stored in a system partition is replaced with the found upgraded library file, and the upgraded library file is loaded, thereby avoiding the upgraded library file from failing to be loaded when the system application corresponding to the upgrade installation package is upgraded separately; and also in the solution according to the implements, the entire system is avoided from being upgraded when some system application is upgraded separately, thereby lowering the overhead of the system and improving the efficiency of upgrading the system application as well as improving the experience of a user to some extent.

Based upon the same idea of the method of loading a library file of a system application according to the invention, an embodiment further provides a terminal to perform the method above. The terminal can be a handset, a PC or another user terminal with the Android system, and a network set-top box or another TV device with the Android system. The terminal will be described below in a particular embodiment.

Figure 4:
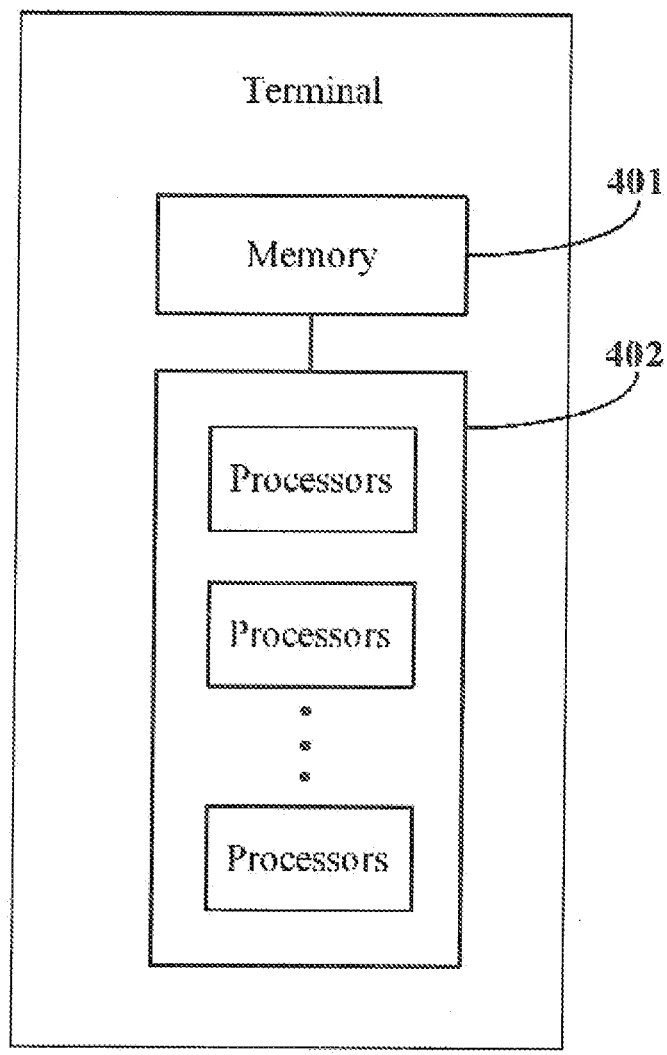
FIG. 4 is a schematic structural diagram of a terminal according to an embodiment.

As illustrated in FIG. 4, there is illustrated a schematic structural diagram of a terminal according to an embodiment, and the terminal generally includes a memory 401 and one or more processors 402, where the memory 401 has one or more computer readable program codes stored therein, and the one or more processors 402 are configured to perform the one or more computer readable program codes to implement:

When it is determined that the package name of an upgrade installation package is recorded in system properties, to search a user partition by the package name of the upgrade installation package for an upgraded library file corresponding to the upgrade installation package.

Where the package name of the upgrade installation package is recorded in the system properties when it is determined that an application corresponding, to the upgrade installation package is a system application.

To replace an original library file stored in a system partition with the found upgraded library file.

To delete the package name of the upgrade installation package recorded in the system attributes.

In an embodiment, the one or more processors 402 are further configured to perform the one or more computer readable program codes to implement:

To inquire an application upgrade server periodically, where there is a network connection established between the terminal and the application upgrade server.

To download the upgrade installation package when the upgrade installation package is found, where the upgrade installation package is an installation package corresponding to a new version corresponding to the application in the application upgrade server.

In an embodiment, the one or more processors 402 are further configured to perform the one or more computer readable program codes to implement:

To invoke a system service program interface to install the upgrade installation package, where the upgraded library file corresponding to the upgrade installation package is stored in the user partition.

To detect the upgrade installation package and to record the package name of the upgrade installation package in the system properties when it is determined that the application corresponding to the upgrade installation package is a system application.

In an embodiment, in a particular implementation, the upgrade installation package is detected and the package name of the upgrade installation package is recorded in the system properties when it is determined that the application corresponding to the upgrade installation package is a system application particularly as follows: the downloaded upgrade installation package is detected, the name of the upgrade installation package is obtained, an identification bit of the application corresponding to the upgrade installation package is read, and when the identification bit is read as 1, it is determined that the application corresponding to the upgrade installation package is a system application, and the obtained package name of the upgrade installation package is recorded in the system properties.

In an embodiment, the one or more processors 402 are further configured to perform the one or more computer readable program codes: to judge whether the upgraded library file is consistent with the original upgrade installation package stored in the system partition, and if so, to terminate upgrading of the library file; otherwise, to replace the original library file with the upgraded library file and to load the upgraded library file.

Although the preferred embodiments have been described, those skilled in the art benefiting from the underlying inventive concept can make additional modifications and variations to these embodiments. Therefore the appended claims are intended to be construed as encompassing the preferred embodiments and all the modifications and variations coming into the scope of the application.

Evidently those skilled in the art can make various modifications and variations to the invention without departing from the spirit and scope of the application. Thus the application is also intended to encompass these modifications and variations thereto so long as the modifications and variations come into the scope of the claims appended to the invention and their equivalents.

The invention claimed is:

1. A method of upgrading a library file of a system application, comprising:
   when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application;
   replacing an original library file stored in a system partition with the upgraded library file, found in the user partition, in a process, privileged to modify a file in the system partition, among existing processes; and
   deleting the package name of the upgrade installation package recorded in the system properties.

2. A method of upgrading a library file of a system application, comprising:
   when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application;
   replacing an original library file stored in a system partition with the upgraded library file found in the user partition; and
   deleting the package name of the upgrade installation package recorded in the system properties.

3. The method of claim 2, wherein before it is determined that the package name of an upgrade installation package is recorded in the system properties, the method further comprises:
   inquiring an application upgrade server periodically, wherein there is a network connection established between a terminal and the application upgrade server; and
   downloading the upgrade installation package when the upgrade installation package is found, wherein the upgrade installation package is an installation package corresponding to a new version of the application in the application upgrade server.

4. The method of claim 3, wherein after downloading the upgrade installation package, the method further comprises:
invoking a system service program interface to install the upgrade installation package, wherein the upgraded library file corresponding to the upgrade installation package is stored in the user partition; and
detecting the upgrade installation package and recording the package name of the upgrade installation package in the system properties when it is determined that the application corresponding to the upgrade installation package is a system application.

5. The method of claim 4, wherein the detecting the upgrade installation package and recording the package name of the upgrade installation package in the system properties when it is determined that the application corresponding to the upgrade installation package is a system application comprises:
detecting the upgrade installation package, obtaining the name of the upgrade installation package, reading an identification of the application corresponding to the upgrade installation package, and when the identification corresponds to a system application, determining that the application corresponding to the upgrade installation package is a system application, and recording the obtained package name of the upgrade installation package in the system properties.

6. The method of claim 2, wherein before replacing the original library file with the upgraded library file, the method further comprises:
judging whether the upgraded library file is consistent with the original upgrade installation package stored in the system partition, and if so, then terminating upgrading of the library file; otherwise, replacing the original library file with the upgraded library file.

7. A terminal, comprising a memory and one or more processors, wherein the memory has one or more computer readable program codes stored therein, and the one or more processors are configured to perform the one or more computer readable program codes to implement:
when it is determined that the package name of an upgrade installation package is recorded in system properties, to search a user partition by the package name of the upgrade installation package for an upgraded library file corresponding to the upgrade installation package, wherein the package name of the upgrade installation package is recorded in the system properties when it is determined that an application corresponding to the upgrade installation package is a system application;
to replace an original library file stored in a system partition with the upgraded library file found in the user partition; and
to delete the package name of the upgrade installation package recorded in the system properties.

8. The terminal of claim 7, wherein the one or more processors are further configured to perform the one or more computer readable program codes to implement:
to inquire an application upgrade server periodically, wherein there is a network connection established between the terminal and the application upgrade server; and
to download the upgrade installation package when the upgrade installation package is found, wherein the upgrade installation package is an installation package corresponding to a new version of the application in the application upgrade server.

9. The terminal of claim 8, wherein the one or more processors are further configured to perform the one or more computer readable program codes:
to invoke a system service program interface to install the upgrade installation package, wherein the upgraded library file corresponding to the upgrade installation package is stored in the user partition; and
to detect the upgrade installation package and to record the package name of the upgrade installation package in the system properties when it is determined that the application corresponding to the upgrade installation package is a system application.

10. The terminal of claim 9, wherein the detecting the upgrade installation package and recording the package name of the upgrade installation package in the system properties when it is determined that the application corresponding to the upgrade installation package is a system application comprises:
detecting the upgrade installation package, obtaining the name of the upgrade installation package, reading an identification of the application corresponding to the upgrade installation package, and when the identification corresponds to a system application, determining that the application corresponding to the upgrade installation package is a system application, and recording the obtained package name of the upgrade installation package in the system properties.

11. The terminal of claim 7, wherein the one or more processors are further configured to perform the one or more computer readable program codes to implement:
to judge whether the upgraded library file is consistent with the original upgrade installation package stored in the system partition, and if so, to terminate upgrading of the library file; otherwise, to replace the original library file with the upgraded library file and to load the upgraded library file.

* * * * *